(12) United States Patent
Avery

(10) Patent No.: US 7,117,278 B2
(45) Date of Patent: Oct. 3, 2006

(54) METHOD FOR MERGING A PLURALITY OF DATA STREAMS INTO A SINGLE DATA STREAM

(75) Inventor: James M. Avery, Westford, MA (US)

(73) Assignee: Sun Micro Systems, Inc., Santa Clara, CA (US)

( * ) Notice: Subject to any disclaimer, the term of this patent is extended or adjusted under 35 U.S.C. 154(b) by 953 days.

(21) Appl. No.: 09/905,483

(22) Filed: Jul. 12, 2001

(65) Prior Publication Data

US 2003/0012187 A1    Jan. 16, 2003

(51) Int. Cl.
*G06F 13/12* (2006.01)

(52) U.S. Cl. .......................... 710/62; 710/29; 709/231; 709/234; 370/229; 370/230.01; 370/231; 370/232

(58) Field of Classification Search .................... 710/7, 710/20, 21, 52, 62
See application file for complete search history.

(56) References Cited

U.S. PATENT DOCUMENTS

| | | | | |
|---|---|---|---|---|
| 4,677,616 | A |   | 6/1987 | Franklin ...................... 370/423 |
| 4,860,357 | A |   | 8/1989 | Avery ........................... 381/41 |
| 4,926,418 | A |   | 5/1990 | Cidon ......................... 370/85.5 |
| 5,245,609 | A |   | 9/1993 | Ofek ........................... 370/94.3 |
| 5,311,510 | A | * | 5/1994 | Moriue et al. ............... 370/428 |
| 5,359,720 | A | * | 10/1994 | Tamura et al. .............. 711/108 |
| 5,588,030 | A |   | 12/1996 | Riggle et al. ............... 375/368 |
| 5,687,325 | A |   | 11/1997 | Chang ......................... 710/104 |
| 5,778,342 | A | * | 7/1998 | Erell et al. ................... 704/256 |
| 5,889,776 | A |   | 3/1999 | Liang .......................... 370/389 |
| 5,941,961 | A | * | 8/1999 | Nakahara ..................... 710/52 |
| 6,058,436 | A |   | 5/2000 | Kosco .......................... 710/11 |
| 6,118,788 | A |   | 9/2000 | Kermani ...................... 370/461 |
| 6,230,218 | B1 | * | 5/2001 | Casper et al. ................ 710/20 |
| 6,247,058 | B1 |   | 6/2001 | Miller et al. ................ 709/234 |
| 6,327,540 | B1 | * | 12/2001 | Miyano et al. ............... 702/57 |

(Continued)

OTHER PUBLICATIONS

U.S. Appl. No. 09/905,281, Avery, Apparatus for Merging a Plurality of Data Streams into a Single Data Stream, Jul. 13, 2001.

(Continued)

*Primary Examiner*—Fritz Fleming
*Assistant Examiner*—Niketa I. Patel
(74) *Attorney, Agent, or Firm*—Park, Vaughan & Fleming LLP

(57) ABSTRACT

A method of merging a first data stream with a second data stream to generate a third data stream. The method comprises receiving a first packet from the first data stream, the first packet containing a first packet ID and a first data payload and receiving a second packet from the second data stream, the second packet containing a second packet ID and a second data payload. The method also includes storing first data in a plurality of packet ID arrival registers, a first portion of the first data indicating that the first packet ID is equal to the ID associated with a first of the plurality of the packet ID arrival registers and storing second data in the plurality of packet ID arrival registers, a first portion of the second data indicating that the second packet ID is equal to the ID associated with the second of the plurality of the packet ID arrival registers. The method further includes calculating a first autocorrelation vector; calculating a second autocorrelation vector; and based at least in part upon a comparison of the magnitude of the first autocorrelation vector and the magnitude of the second autocorrelation vector, including the first packet in the third data stream.

14 Claims, 10 Drawing Sheets

U.S. PATENT DOCUMENTS

Figure 1:
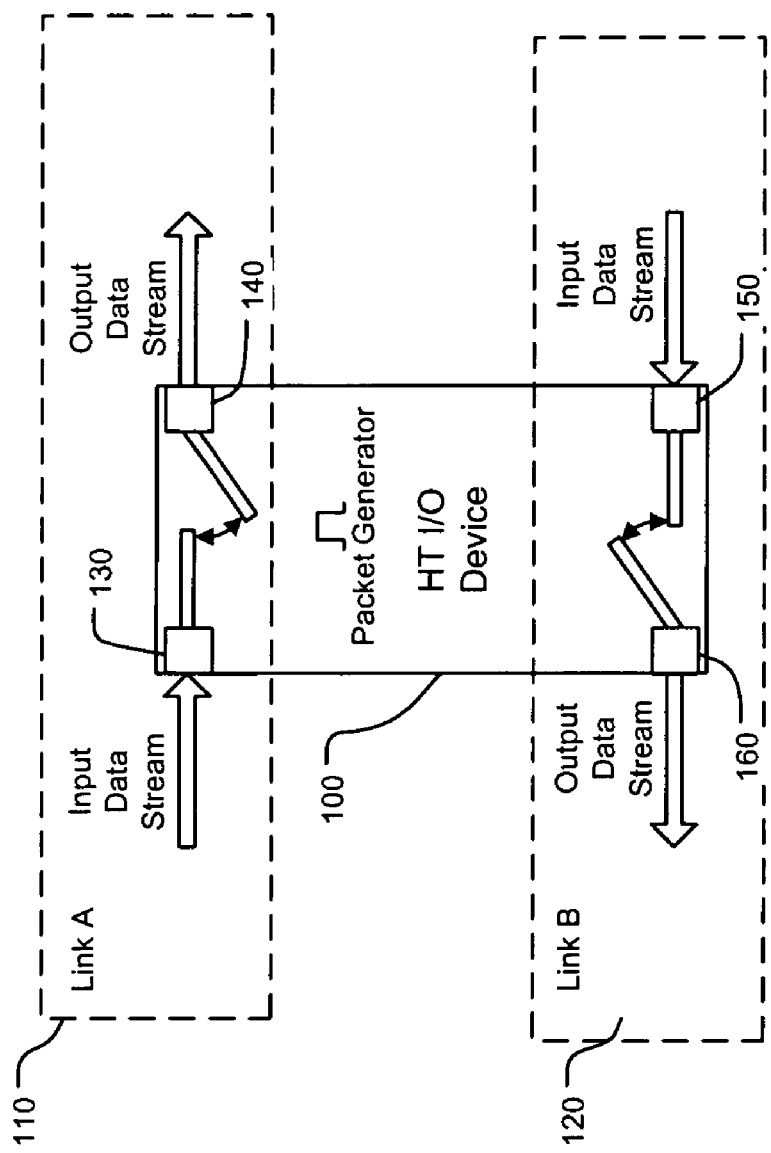

| | | | |
|---|---|---|---|
| 6,363,077 B1 | 3/2002 | Wong et al. | 370/422 |
| 6,483,841 B1 | 11/2002 | Chang et al. | 370/412 |
| 6,571,321 B1 | 5/2003 | Rowlands et al. | 711/141 |
| 6,574,708 B1 | 6/2003 | Hayter et al. | 711/118 |
| 6,757,768 B1 * | 6/2004 | Potter et al. | 710/112 |

OTHER PUBLICATIONS

API NetWorks, Inc., The Lightning Data Transport I/O Bus Architecture, Revision 1001, 2000.

API NetWorks, Inc., HyperTransport: Universal Interconnect Solution for I/O, Mar. 7, 2001.

API NetWorks, Inc., Lightning Data Trasport: Universal Interconnect Solution for I/O, Dec. 13, 2000.

API NetWorks, Inc., HyperTransport Applications in Embedded DSP/RISC Based Systems: A High-Bandwidth, Low-Complexity Embedded I/O Interconnect Architecture.

PCI-to-PCI Bridge Architecture Specification, Revision 1.1, Dec. 18, 1998.

PCI Local Bus Specification, Revision 2.2, Dec. 18, 1998.

Robert M. Metcalfe, Ethernet: Distributed Packet Switching for Local Computer Networks, Jul. 1976.

J. W. Son, An input polling arbitration mechanism for a gigabit packet switch.

Cisco Systems, Dynamic Packet Transport Technology and Performance, 2000.

Farooq M. Anjum, Balanced-RED: An Algorithm to achieve Fairness in the Internet, Mar. 8, 1999.

William H. Press, Numerical Recipes in C, 1992, Chapter 12 and 13.

Alain Mayer, Local and Congestion-Driven Fairness Algorithm in Arbitrary Topology Networks, Jun. 2000.

Cisco, Dynamic Packet Transport Technology and Performance.

Rajendra K. Jain, A Quantitative Measure of Fairness and Discrimination for Resource Allocation in Shared Computer System, Sep. 26, 1984.

Sangyup Shim, Supporting Continuous Media: Is Serial Storage Architecture (SSA) Better Than SCSI?, 1997.

Mark W. Garrett, Analysis, Modeling and Generation of Self-Similar VBR Video Traffic, 1994.

Will E. Leland, On the Self-Similar Nature of Ethernet Traffic, 1994.

Jonathan H. B. Deane, The dynamics of deterministic data networks, Jun. 12, 1996.

Terence D. Todd, The Token Grid Network, Jun. 1994.

Jan Beran, Fitting Long-Memory Modules by Generalized Linear Regression, Dec. 1993.

Jan Beran, Statistical Methods for Data with Long-Range Dependence, Nov. 1992.

Jan Beran, On robust local polynomial estimation with long-memory errors.

Mark W. Garett, Contributions toward real-time services on packet switched networks, 1993.

Jonathan H. B. Deane, Chaotic traffic flow in local area networks.

* cited by examiner

| Rxx mag (5) | Rxx mag (4) | Rxx mag (3) | Rxx mag (2) | Rxx mag (1) | Rxx mag (0) |
|---|---|---|---|---|---|
| Rxx mag (5) | Rxx mag (4) | Rxx mag (3) | Rxx mag (2) | Rxx mag (1) | Rxx mag (0) |
| Rxx mag (5) | Rxx mag (4) | Rxx mag (3) | Rxx mag (2) | Rxx mag (1) | Rxx mag (0) |
| Rxx mag (5) | Rxx mag (4) | Rxx mag (3) | Rxx mag (2) | Rxx mag (1) | Rxx mag (0) |
| Rxx mag (5) | Rxx mag (4) | Rxx mag (3) | Rxx mag (2) | Rxx mag (1) | Rxx mag (0) |

700

ID 0: Rxx mag ID 0 max
ID 1: Rxx mag ID1 max
ID m: Rxx mag ID m max
ID p: Rxx mag ID p max
ID q: Rxx mag ID q max

710 x(5) x(4) x(3) x(2) x(1) x(0)    max

*Figure 7*

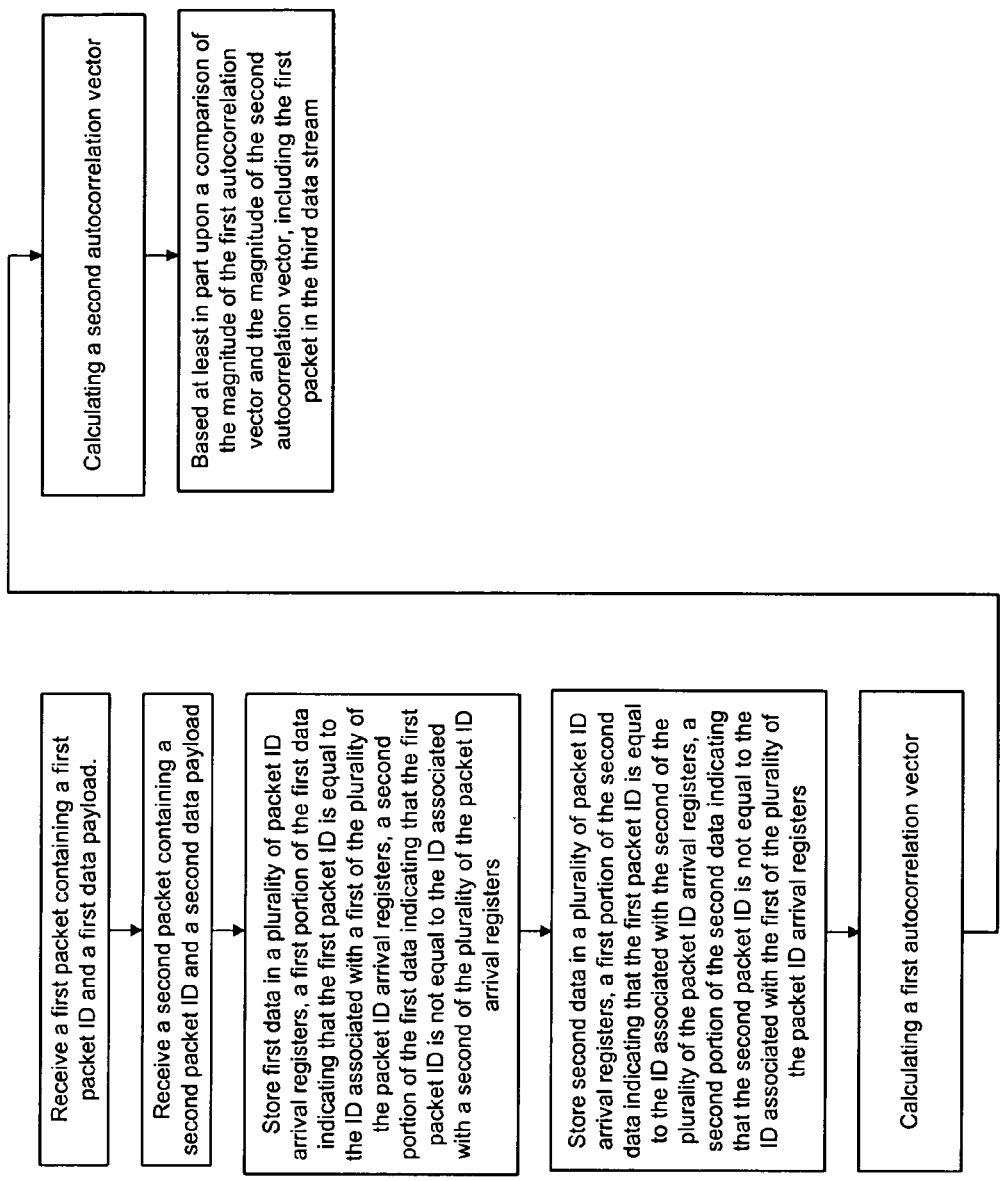

METHOD FOR MERGING A PLURALITY OF DATA STREAMS INTO A SINGLE DATA STREAM

This patent application discloses subject matter that is related to the subject matter disclosed in U.S. patent application Ser. No. 09/905,281 entitled "Apparatus for Merging a Plurality Of Data Streams Into a Single Data Stream" filed on even date herein. The above Patent Application is hereby incorporated by reference.

1. FIELD OF THE INVENTION

The present invention generally relates to arbitration methods. More specifically, the present invention relates to a novel method of merging a plurality of data streams into a single data stream.

2. BACKGROUND

In an effort to increase I/O bandwidth in high performance processor based systems, a number of companies have developed the HyperTransport ("HT") I/O interconnect structure. Briefly, the HT I/O interconnect structure is a scalable device level architecture that provides a significant increase in transaction throughput over existing I/O bus architectures such as Peripheral Component Interconnect ("PCI") and Advanced Graphics Port ("AGP").

The foundation of the HT I/O interconnect is dual point-to-point unidirectional links consisting of a data path, control signals, and clock signals. The HT I/O interconnect can provide both point-to-point links and a scalable network topology using HT I/O switching fabrics. Thus, an HT based system can be expanded using HT switches to support multilevel, highly complex systems.

Communications between multiple HT I/O devices are known as data streams. Each data stream contains one or more packets of information. Each packet of information contains a packet ID and a data payload. The packet ID is also commonly referred to as a unit ID. Because all packets are transferred to or from a host bridge, the packet ID provides information that can be utilized to determine the source or destination of the packet. A more detailed description of the HT I/O interconnect structure is presented in Appendix A.

FIG. 1 presents an HT I/O device 100 that interfaces with a first unidirectional link 110 and a second unidirectional link 120. Thus, the HT I/O device 100 can receive input data streams and transmit output data streams via unidirectional links 110 and 120. The HT I/O device 100 contains input ports 130 and 150 for receiving data streams and output ports 140 and 160 for transmitting data streams. The HT device 100 may also contain circuitry for generating packets that can be transmitted as output data streams via the output ports 140 and 160.

Figure 2:
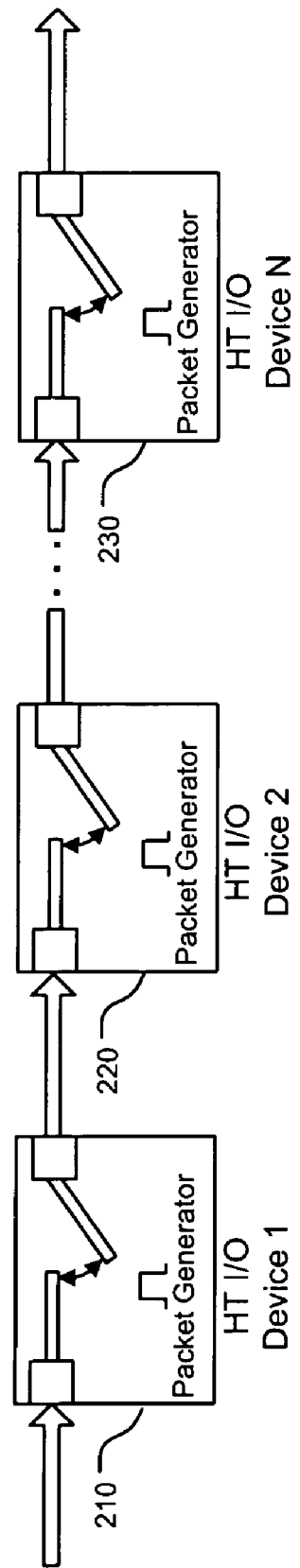

HT I/O devices may also be daisy chained as shown in FIG. 2. FIG. 2 presents a portion of a single unidirectional link in an HT I/O interconnect. The unidirectional link shown contains three HT I/O devices 210, 220, and 230. If the first HT I/O device 210 receives a data stream with a destination ID that is equal to the ID of the first HT I/O device 210, then the first HT I/O device 210 will receive and internally process the data stream. However, if the destination ID is not equal to the ID of the first HT I/O device 210, then the first HT I/O device 210 will forward the data stream to the second HT I/O device 220.

As the first HT I/O device 210 may also have the capability to generate packets, the output data stream of the first HT I/O device 210 is a composite of the input packet stream received by the first HT I/O device 210 and the internally generated packets. These internally generated packets will be referred to as an internal data stream.

The data stream received by the first HT I/O device 210 and the device's internal data stream may vary with time. For example, the input data stream for the first HT I/O device 210 may contain no packets over a given time interval. Thus, all packets in the internal data stream generated during that time interval by the first HT I/O device 210 may be transmitted through the first HT I/O device's output port. Alternately, if the data stream received by the first HT I/O device 210 and the device's internal data stream both contain a large number of packets, the HT I/O device may be required to choose between forwarding the received data stream or outputting the internally generated packets. The process by which such a choice is made is known in the art as a forwarding fairness algorithm.

Prior art systems allow an HT I/O device to insert internally generated packets into an output data stream freely if the output data stream is empty. However, if the output data stream contains a large number of packets, the prior art systems only allow the HT I/O device to insert internally generated packets into the output data stream at a rate that is not greater than the rate that the HT I/O device is receiving and forwarding packets from another HT I/O device. Such prior art systems are not optimal. Thus, a more optimal method of merging two data streams into a single data stream is needed.

3. SUMMARY OF INVENTION

One embodiment of the invention is a method of merging a first data stream with a second data stream to generate a third data stream. The method comprises receiving a first packet from the first data stream, the first packet containing a first packet ID and a first data payload and receiving a second packet from the second data stream, the second packet containing a second packet ID and a second data payload. The method also includes storing first data in a plurality of packet ID arrival registers, a first portion of the first data indicating that the first packet ID is equal to the ID associated with a first of the plurality of the packet ID arrival registers, a second portion of the first data indicating that the first packet ID is not equal to the I) associated with a second of the plurality of the packet ID arrival registers; storing second data in the plurality of packet ID arrival registers, a first portion of the second data indicating that the second packet I) is equal to the ID associated with the second of the plurality of the packet ID arrival registers, a second portion of the second data indicating that the second packet ID is not equal to the ID associated with the first of the plurality of the packet ID arrival registers. The method further includes calculating a first autocorrelation vector; calculating a second autocorrelation vector; and based at least in part upon a comparison of the magnitude of the first autocorrelation vector and the magnitude of the second autocorrelation vector, including the first packet in the third data stream.

Another embodiment of the invention includes receiving the first packet from an HT I/O device.

Another embodiment of the invention includes receiving the first packet from an HT I/O device and receiving the second packet from an HT I/O device.

Another embodiment of the invention includes storing a "1" in the first packet ID arrival register.

Another embodiment of the invention includes storing a "0" in the second packet ID arrival register.

Another embodiment of the invention includes calculating a biased autocorrelation vector.

Another embodiment of the invention includes calculating an unbiased autocorrelation vector.

Another embodiment of the invention is wherein the act of calculating the first autocorrelation vector is performed by a HyperTransport I/O device.

Another embodiment of the invention is wherein the act of calculating the first autocorrelation vector is performed by a HyperTransport I/O switch.

Another embodiment of the invention is wherein the act of calculating the first autocorrelation vector includes calculating the following equation:

$$Rxx(T) = \frac{1}{N-T}\sum_{n=0}^{N-1} x(n)x(n+T)$$

where T and N are integers, and x is an array that includes data stored in one of the plurality of packet ID arrival registers.

Another embodiment of the invention is wherein the act of receiving the first packet includes receiving the first packet from a second HT I/O device and wherein the act of receiving the second packet includes receiving the second packet from a third HT I/O device.

Another embodiment of the invention is wherein the act of receiving the first packet includes receiving the first packet from an internal port within the HT I/O device and wherein the act of receiving the second packet includes receiving the second packet from a second HT I/O device.

Another embodiment of the invention is wherein the act of calculating the first autocorrelation vector includes copying the data in the first packet ID arrival register, and shifting the copied data by T elements, where T is an integer.

Another embodiment of the invention is a method, performed by an HT I/O device, of storing a first packet in a first buffer and storing a second packet in a second buffer. The method includes receiving a first packet from a first data stream, the first packet containing a first packet ID and a first data payload and receiving a second packet from the second data stream, the second packet containing a second packet ID and a second data payload. The method also includes storing the first packet in a first buffer, the first buffer associated with a buffer ID that is equal to the first packet ID and storing the second packet in a second buffer, the second buffer associated with a buffer ID that is equal to the second packet ID.

Another embodiment of the invention is a method of storing first data and second data. The method includes receiving a first packet from a first data stream, the first packet containing a first packet ID and a first data payload and receiving a second packet from a second data stream, the second packet containing a second packet ID and a second data payload. The method also includes storing first data in a plurality of registers, a first portion of the first data indicating that the first packet ID is equal to the ID associated with a first of the plurality of registers, a second portion of the first data indicating that the first packet ID is not equal to the ID associated with a second of the plurality of the registers and storing second data in the plurality of registers, a first portion of the second data indicating that the second packet ID is equal to the ID associated with the second of the plurality of the registers, a second portion of the second data indicating that the second packet ID is not equal to the ID associated with the first of the plurality of the registers.

4. BRIEF DESCRIPTION OF THE FIGURES

FIG. 1 presents an HT I/O device that interfaces with two unidirectional links.

FIG. 2 presents a portion of a single unidirectional link in an HT I/O interconnect.

Figure 3:
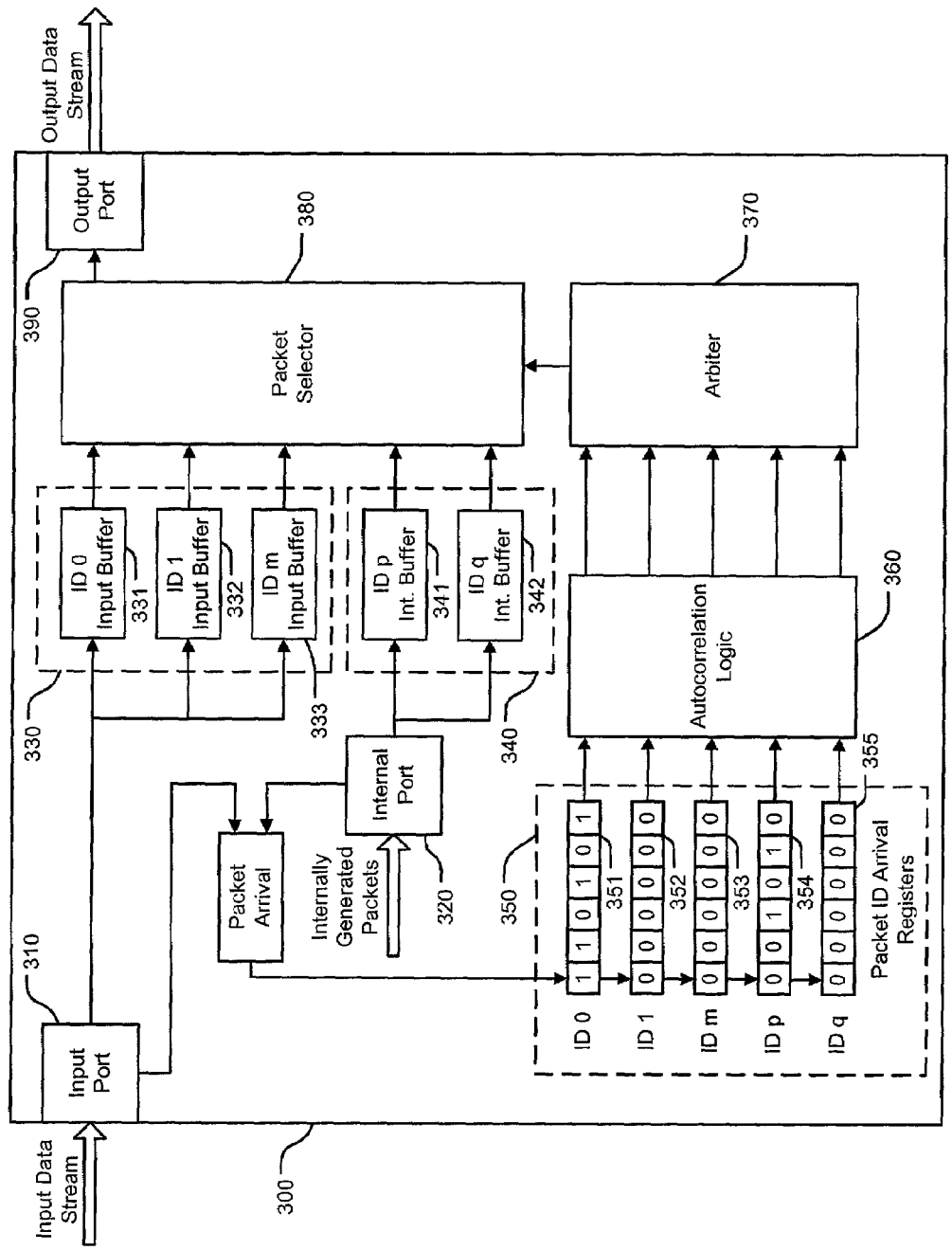

FIG. 3 presents a portion of an HT I/O device.

Figure 4:
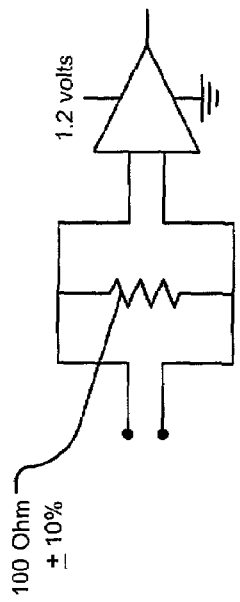

FIG. 4 presents one embodiment of an input port.

Figure 5:
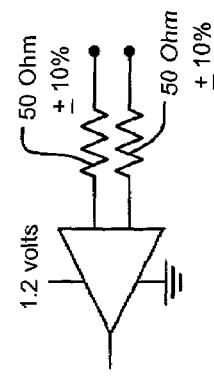

FIG. 5 presents one embodiment of an output port.

Figure 6:
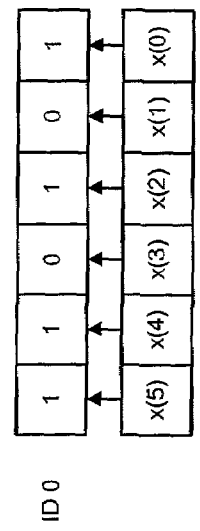

FIG. 6 presents one method of utilizing data contained in a packet ID arrival register in an autocorrelation function.

FIG. 7 presents one embodiment of an autocorrelation magnitude table and one embodiment of a maximum autocorrelation magnitude table.

Figure 8:
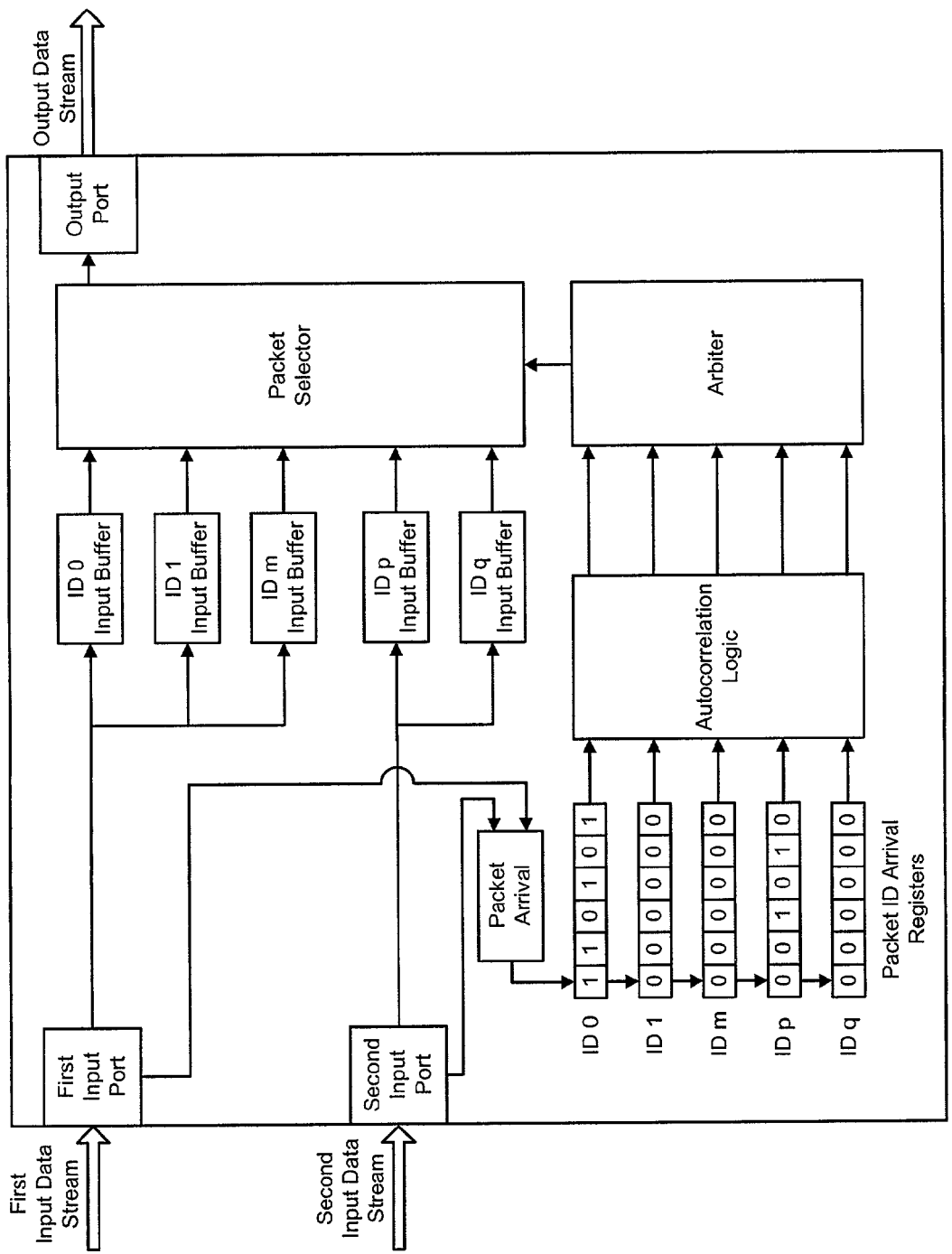

FIG. 8 presents a portion of an HT I/O switch.

Figure 9:
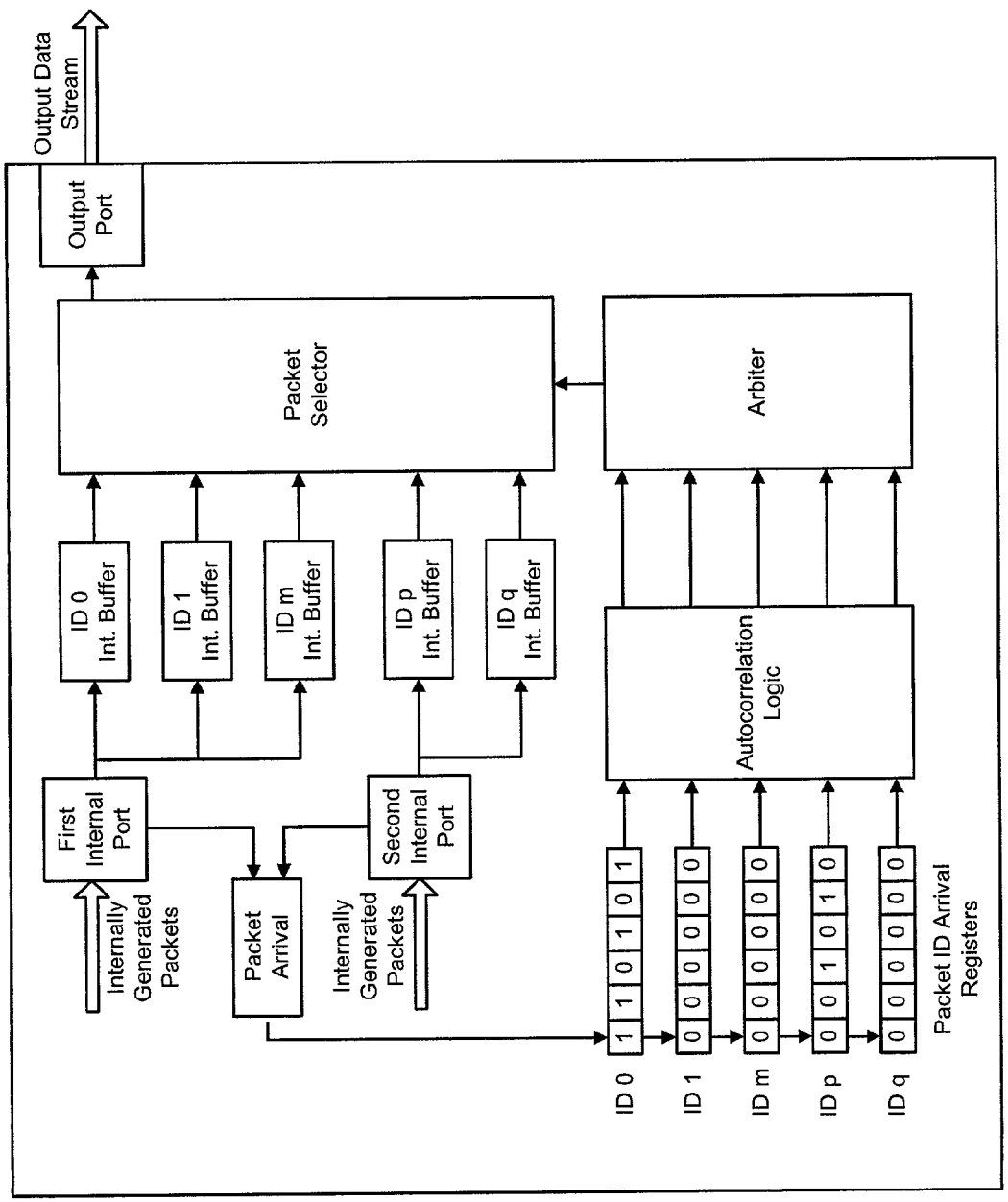

FIG. 9 presents a portion of an HT I/O device with two internal ports.

Figure 10:
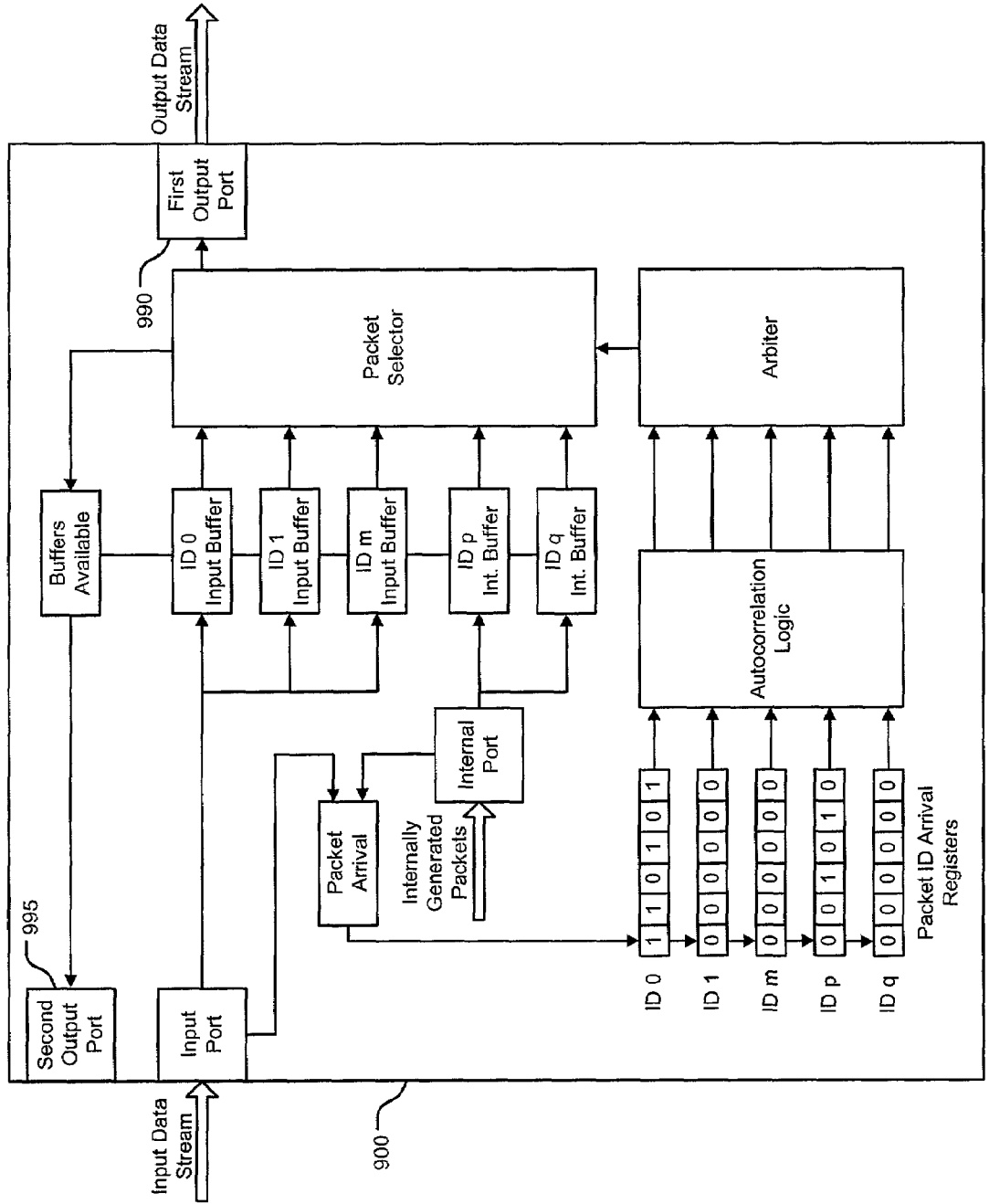

FIG. 10 presents a portion of an HT I/O device that sends flow control information to packet transmitters.

Figure 11:
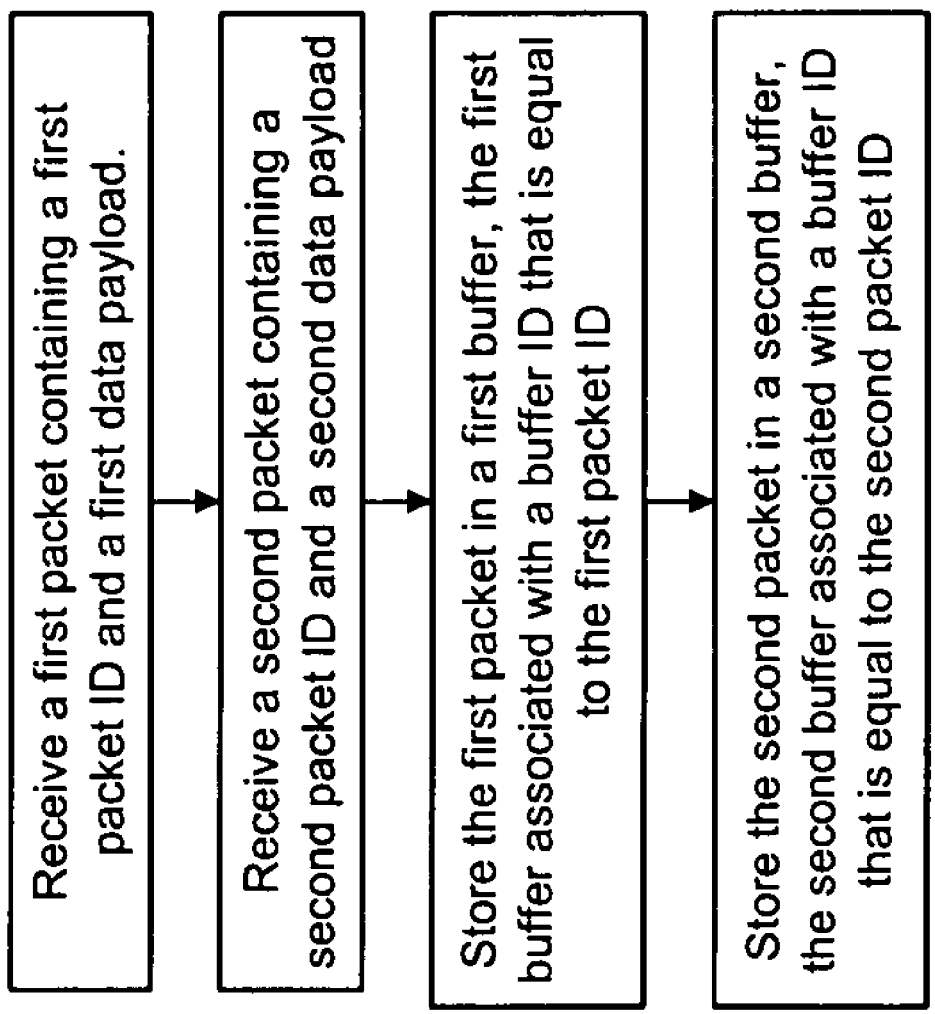

FIG. 11 presents a flow chart of a method to store data in a plurality of registers.

FIG. 12 presents a flow chart of a method to merge two data streams to generate a third data stream.

5. DESCRIPTION OF THE PREFERRED EMBODIMENTS

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

FIG. 3 presents a portion of an HT I/O device 300. The HT I/O device 300 is coupled to a unidirectional link in an HT I/O interconnect structure. The HT I/O device 300 would also typically be coupled to another unidirectional link. However, this second unidirectional link is not shown in order not to obscure the invention.

5.1 Input Port

The HT I/O device 300 can receive a data stream via the device's input port 310. The input port 310 may be any type of port that is operable to receive a data stream. In one embodiment, the input port 310 includes a plurality of input receivers configured as shown in FIG. 4. Each of the plurality of input receivers can receive a single differential signal. Examples of such differential signals could include command, address, data, clock, and control signals. By including sufficient input receivers configured as shown in FIG. 4, the HT I/O device 300 can receive a data stream from an HT I/O interconnect.

5.2 Internal Port

In addition to the input port 310, the HT I/O device may include an internal port 320. The internal port 320 may be any type of port that is operable to receive and optionally temporarily store, one or more packets in a data stream that were generated by the HT I/O device 300. For example, the internal port 320 may be a buffer such as a circular buffer, a first-in-first-out buffer, or a queue buffer. Alternatively, the internal port 320 may be one or more registers.

5.3 Input Buffers

As shown in FIG. 3, the input port 310 is coupled to a plurality of input buffers 330. Input buffers 331, 332, and 333 maybe any type of buffer, such as but not limited to circular buffers, first-in-first-out buffers, or queue buffers. Alternatively, such buffers may be a plurality of registers. Each of the input buffers 331, 332, and 333 is associated with a unique ID. As shown in FIG. 3, the first input buffer 331 is associated with ID 0, the second input buffer 332 is associated with ID 1, and the third input buffer 333 is associated with ID m. These input buffers 331, 332, and 333 store packets having a packet ID that is equal to the ID associated with the input buffer.

For example, ID 0 may be set to 10 h. Thus, if two packets are received by input port 310 and the packet ID for both of the packets is equal to 10 h, then the packets would be stored in the first input buffer 331. Because the ID of each input buffer is unique, the packets would only be stored in a single input buffer.

5.4 Internal Buffers

In embodiments of the invention that include an internal port 320, the internal port 320 may be coupled to a single internal buffer (not shown) or a plurality of internal buffers 340. Internal buffers 341 and 342 may be any type of buffer or register. Each of the internal buffers 341 and 342 is associated with a unique ID. As shown in FIG. 3, the first internal buffer 341 is associated with ID p and the second input buffer 342 is associated with ID q. These internal buffers 341 and 342 store packets generated internally by the HT I/O device having a packet ID that is equal to the ID associated with the internal buffer.

A summary of the previously discussed method of storing packets in input buffers 330 and/or in internal buffers 340 is summarized in FIG. 10.

5.5 Packet ID Arrival Registers

As shown in FIG. 3, the input port 310 is also coupled to a plurality of packet ID arrival registers 350. Each of these registers is associated with a unique ID. As shown in FIG. 3, the first packet ID arrival register 351 is associated with ID 0, the second packet ID arrival register 352 is associated with ID 1, and the third packet ID arrival register 353 is associated with ID m. These packet ID arrival registers 351, 352, and 353 store data that indicates whether a packet received by the input port 310 contains a packet ID that is equal to the ID associated with the packet ID arrival register.

For example, as discussed above, ID 0 may be set to 10 h. Thus, if a packet is received by input port 310 and the packet ID is equal to 10 h, then data, such as a "1", would be stored in the first packet ID arrival register 351. Because the ID of each packet ID arrival register is unique, data, such as a "0", would be stored in each of the other packet ID arrival registers.

A packet ID arrival register may be any type of register. However, in some embodiments of the invention, the packet ID arrival registers would be shift registers so that older data could be efficiently shifted out as new data is stored in the packet ID arrival registers.

In embodiments of the invention that include an internal port 320, the internal port 320 is also coupled to the plurality of packet ID arrival registers 350. In these embodiments, a packet ID arrival register's ID, such as the fourth packet ID arrival register's ID, ID p, shown in FIG. 3, may be set to 15 h. Thus, if the HT I/O device 300 internally generates a packet with a packet ID equal to 15 h, and the packet is sent to the internal port, then data, such as a "1", would be stored in the fourth packet ID arrival register 354. Because the ID of each packet ID arrival register is unique, data, such as a "0", would be stored in each of the other packet ID arrival registers 351, 352, 353 and 355.

5.6 Autocorrelation Logic

The packet ID arrival registers are coupled to autocorrelation logic 360. In one embodiment, for each packet ID arrival register, the autocorrelation logic 360 uses the data stored in the packet ID arrival register to calculate the autocorrelation vector, Rxx(T), of the data stored in the packet ID arrival register over the interval T. The autocorrelation vector of such data can be calculated using the following equation:

$$Rxx(T) = \frac{1}{N-T}\sum_{n=0}^{N-1} x(n)x(n+T) \quad T = (0, 1, 2, \ldots, N-1)$$

In the above equation, T and N are integers, and x( ) is an array that includes data stored in one of the plurality of packet ID arrival registers 350. Conceptually, the summed portion of the above equation corresponds to taking data in a packet ID arrival register, shifting it by T elements, multiplying the result element by element with the unshifted packet ID arrival register, and then summing the products. Thus, the magnitude of the autocorrelation vector, Rxx(T), represents the approximate arrival rate of incoming packets. Similarly, peaks in the autocorrelation vector, Rxx(T), approximate the average arrival frequency of incoming packets.

FIG. 6 indicates how the data contained in the first packet ID arrival register 351 can be utilized in the above equation. The right most element in the first packet ID arrival register 351 is addressed as x(0). Similarly, the leftmost element in the first packet ID arrival register 351 is addressed as x(5). As discussed above, a "1" in the array indicates the arrival of a packet that contains a packet ID that is equal to the ID associated with a specific packet ID arrival register. Similarly, a "0" in the array indicates the arrival of a packet that contains a packet ID that is not equal to the ID of a specific packet ID arrival register. By selecting such values for the array, i.e., "1" and "0", the multiplication product x(n)x(n+T) may be replaced with x(n) & x(n+T). Such a replacement will reduce the complexity and die size of the autocorrelation logic 360.

In other embodiments of the invention, the above autocorrelation vector, Rxx(T), is scaled. For example, the biased estimate of the autocorrelation vector:

$$Rxx_{biased}(T) = \frac{Rxx(T)}{N-1}$$

may be calculated by the autocorrelation logic 360. Alternatively, the unbiased estimate of the autocorrelation vector:

$$Rxx_{unbiased}(T) = \frac{Rxx(T)}{N-1-|T|}$$

may be calculated by the autocorrelation logic 360.

5.7 Arbiter

The packet arrival determination logic 360 is coupled to an arbiter 370 as shown in FIG. 3. The arbiter 370 receives the autocorrelation vectors from the packet arrival determination logic 360 and determines which packet should be output by the output port 329.

In one embodiment, the arbiter 370 contains an autocorrelation magnitude table 700. As shown in FIG. 7, each row of the autocorrelation magnitude table 700 is associated with a packet ID arrival register. In addition, each column in the autocorrelation magnitude table 700 is associated with a packet whose arrival data is stored in a packet ID arrival register. The autocorrelation magnitude table 700 may be a buffer such as a circular buffer, a first-in-first-out buffer, or a queue buffer. Alternatively, the autocorrelation magnitude table 700 may be composed of registers such as shift registers.

In addition to the autocorrelation magnitude table 700, the arbiter may also contain a maximum autocorrelation magnitude table 710. Each element of the maximum autocorrelation magnitude table 710 is associated with a row of the autocorrelation magnitude table 700, and hence, a packet ID arrival register and a packet ID. The maximum autocorrelation magnitude table 710 may be composed of any of the above buffers or registers.

After the arbiter 370 receives the autocorrelation vector, Rxx(T), for each of the plurality of packet ID arrival registers 350, the arbiter 370 calculates the magnitude of each of the autocorrelation vectors and stores the magnitudes in the autocorrelation magnitude table 700.

Next, for each row in the maximum autocorrelation magnitude table 710, the arbiter 370 calculates the maximum of the autocorrelation magnitudes in each row of the autocorrelation magnitude table 700 and places such maximum values in the maximum autocorrelation magnitude table 710. For example, if the maximum autocorrelation magnitude of the 6 elements in the autocorrelation magnitude table row associated with ID 0, as shown in FIG. 7, is 10 h then the value of 10 h would be stored in the first row of the maximum autocorrelation magnitude table 710.

Next, the arbiter 370 determines which element in the maximum autocorrelation magnitude table 710 contains the largest autocorrelation magnitude. The arbiter 370 then issues a command to the packet selector 380, which is discussed in Section 5.8, to select a packet with the packet ID that is associated with such element.

In still other embodiments of the invention, the arbiter 370 receives $Rxx_{biased}(T)$ or $Rxx_{unbiased}(T)$ vectors instead of the Rxx(T) vectors discussed above. In these embodiments, the arbitration methods would be substantially identical to the methods discussed above.

5.8 Packet Selector

The input buffers 330, the internal buffers 340, and the arbiter 370 are each coupled to a packet selector 380. The packet selector 380 can receive packets from any of the plurality of input buffers 330 or from any of the plurality of internal buffers 340. However, the packet selector 380 will receive a packet from these buffers 330 and 340 when it is commanded to do so by the arbiter 370. Thus, when the packet selector 380 receives a command from the arbiter 370 to select a packet from one of these buffers 330 and 340, the packet selector 380 receives a packet and passes the packet to the output port 390.

5.9 Output Port

As shown in FIG. 3, the packet selector 380 is coupled to an output port 390. The output port may be any type of port that is operable to generate a data stream. In one embodiment, the output port includes a plurality of output drivers configured as shown in FIG. 5. Each of the plurality of output drivers can generate a single differential signal, such as but not limited to, command, address, data, clock, and control signals.

5.10 Source IDs, Destination IDs, and Packet IDs

In the above description, packet IDs, which provide information relating to the source or destination of packets, were associated with specific input buffers, internal buffers, and packet ID arrival registers. However, in other embodiments of the invention, the input buffers, internal buffers, and packet ID arrival registers could be associated with any packet information that can be utilized to identify a packet.

5.11 Data Streams

As discussed above, FIG. 3 presents only a portion of an HT I/O device 300. The HT I/O device 300 is shown coupled to a single unidirectional link in an HT I/O interconnect structure. The HT I/O device 300 would also typically be coupled to another unidirectional link. However, this second unidirectional link is not shown in order not to obscure the invention. In many of the embodiments of the invention, the HT I/O device 300 would also include input buffers, internal buffers, packet ID arrival registers, autocorrelation logic, an arbiter, and a packet selector. These components would operate as discussed above to merge an input data stream from the second unidirectional link with the HT I/O device's internal data stream into a single output data stream on the second unidirectional link.

While some of the embodiments discussed above merge an input data stream and an internal data stream into a single output data stream, the invention is not so limited. Some embodiments of the invention merge a data stream from one input port with other data stream(s) from one or more input ports. For example, FIG. 8 presents an HT I/O switch capable of merging data streams received from a plurality of input ports into a single output data stream.

Other embodiments of the invention, such as shown in FIG. 9, would merge a plurality of internal data streams into a single output data stream. Still other embodiments of the invention would merge one or more input data streams with one or more internal data streams.

5.12 Buffer Credits

Some bus architectures, such as the HT I/O interconnect architecture, are flow controlled using a coupon-based scheme. In such bus architectures, a packet transmitter contains a counter that corresponds to the free space available in a buffer at the packet receiver, such as an HT I/O device. After initialization, the packet receiver sends packets to the packet transmitter to indicate the free space available in the packet transmitter buffer. This information is stored in a counter in the packet transmitter. Thereafter, when the packet transmitter sends a packet to the packet receiver, the packet transmitter decrements the counter. If the counter ever reaches zero, the packet transmitter ceases sending packets to the packet receiver.

In some embodiments of the invention, such as shown in FIG. 10, when the HT device 900 passes a packet to the first output port 990, the HT device also sends a packet containing flow control information to the packet transmitter via the second output port 995.

5.13 Conclusion

A summary of the previously discussed method of merging a first data stream with a second data stream to generate a third data stream is summarized in FIG. 12.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

Appendix A

The Lightning Data Transport I/O Bus Architecture

API NetWorks, Inc.
LDT I/O White Paper
Revision # 1001

The Lightning Data Transport I/O Bus Architecture 12.8 Gigabyte/second Bandwidth I/O Bus Solution Builds on PCI Bus Concepts to Deliver High Performance for Embedded Systems

Executive Summary

High performance networking and communications systems, digital consumer electronics, information appliances, set-top boxes, and office automation applications are employing high speed, low power 32- and 64-bit embedded processors to provide specialized functionality at a reduced system cost. With embedded processor technology reaching 1 GHz and up clock frequencies, embedded system developers are facing a new problem: speedy processors need equally fast I/O and multiprocessor busses to keep pace.

Compact processors and tightly coupled memory busses are providing compute engines with far greater horsepower than ever before. This provides the compute power to perform high speed processing of complex multimedia data, to handle communications and compression algorithms and to manage complex routing databases and addressing tasks. In addition, communications protocols for connecting systems and networks are advancing the pace of data transfers from the Ethernet standards of the past to the 10 Gigabit and OC-192 speeds of the near future.

Legacy I/O bus architectures are widely used in embedded systems because they are low cost and easily implemented using established software and hardware standards. But, these busses top out at 66 MHz or so. Today's processors operating at 500 MHz and 1 GHz and up clock frequencies need a faster alternative to these low bandwidth busses.

The LDT I/O bus delivers the high bandwidth needed for high performance applications in networking, communications and other embedded applications in a flexible, extensible and easily implemented bus structure. A scalable solution, the LDT I/O bus is capable of providing the bandwidth for next generation processors and communications systems. It is a multivendor standard that is easily implemented. The LDT solution provides a broad selection of bus widths and speeds that can fit the power, space and cost requirements of a wide range of embedded systems from low cost desktop workstations to digital consumer applications and communication systems and networking equipment.

With the ability to scale from narrow configurations with relatively low speed (200 MHz) clock rates to upwards of 32-bit wide, high speed (800 MHz and up) clock rates, the LDT I/O bus architecture is the ideal platform for implementing the next generation of embedded systems.

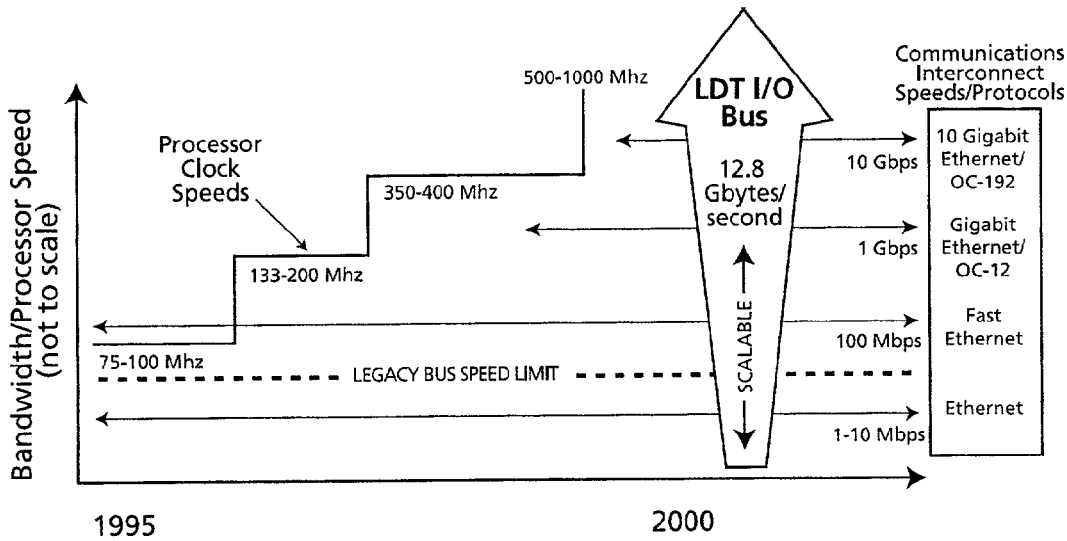

Figure 1 – The Lightning Data Transport I/O Bus or LDT provides the bandwidth needed for today's high speed processors and communication systems by delivering up to 12.8 Gigabyte/second bandwidth in a wide variety of scalable I/O bus implementations.

LDT Overview

API NetWorks, Inc. and its technology partner, AMD, developed the Lightning Data Transport (LDT) I/O bus structure to solve the I/O bottleneck in high performance 32- and 64-bit processor based systems. LDT delivers a scalable architecture that provides better than an order of magnitude increase in bus transaction throughput over existing I/O bus architectures such as PCI, PCI-X and AGP and compares favorably with newly proposed I/O bus structures such as RapidIO™ and Infiniband. From the system design point of view, the LDT I/O bus provides for the same type of tree of buses as the widely used PCI bus, and uses the same ordering rules as PCI. Best of all, it provides high performance throughput while maintaining backward compatibility with existing software developed for the PCI bus, including the ability to support memory read/write operations.

PCI software driver compatibility is a critical factor for the myriad of developers with investments in PCI-compatible driver software. During the past decade, the PCI bus has been called the universal socket because of its widespread use in everything from expansion buses for single-chip controllers to use as the standard I/O bus in desktop PCs and as a mezzanine bus in a number of industrial and embedded systems. The fact that software bus drivers for LDT-based I/O systems can use PCI driver software will lower the cost of entry for a wide variety of providers of I/O and subsystem Intellectual Property or IP. This in turn will make available a wider universe of functions for LDT-based system developers, as compared to those using other proposed high-speed buses.

The flexibility of the LDT I/O bus architecture makes it a comprehensive solution to the needs of today's embedded systems. Clock rates range from 200 MHz to 800 MHz. Standard bus widths of 2, 4, 8, 16, and 32 bits can be employed to tailor the I/O bus characteristics to a specific application. Inherent LDT flexibility includes asymmetric bus widths to support different upstream and downstream bandwidth requirements. Along with each data link is a corresponding control line and one or more clock signals. With a fully implemented dual 32-bit wide data link, the LDT I/O bus can deliver 6.4 Gigabytes of bandwidth in each direction. Even with a simple, dual two-bit wide data link, LDT delivers 400 Mbytes/second in each direction.

This bandwidth is exactly what the next generation of embedded systems will require. For example, a 16-bit LDT I/O bus delivers 25.6 Gbits/second bandwidth capable of supporting two OC192 SONET bit streams, or two 10Gbit/second Ethernet links.

With the ability to support point to point links and network links, using LDT switching fabrics, the LDT I/O bus architecture provides a universal building block structure for implementing complex, high speed systems and simple, single function I/O blocks.

In addition to flexibility, scalability and very high bandwidth, LDT also offers the potential benefit of a very low implementation cost. Because it is part of the AMD processor roadmap for its high volume, desktop PCs and server systems, it will benefit from the economies of scale that come with being a part of the high volume, cost sensitive PC-driven market space. This will be similar to the phenomena experienced as PCI adoption grew beyond the PC market.

This combination of performance, extensibility and low cost of implementation makes the LDT bus an attractive real-world option for the developer of high performance embedded systems, including those used in network routing and switching, packet processing, smart communications equipment, high end digital entertainment and information appliances.

LDT I/O Bus, RapidIO and InfiniBand

In addition to the LDT I/O Bus, there are several other new proposed bus standards attempting to met the needs of next generation, high performance systems. Chief among these are the Motorola proposal, RapidI/O and the communications oriented InfiniBand protocols. RapidI/O, like LDT, is oriented to "in-the-box" communications between processors, memory, I/O and communications channels. InfiniBand is broader in scope and applies a high level network architecture to the problem of inter-system communications. While some InfiniBand proponents may offer intra-box solutions, the primary thrust of the InfiniBand effort seems more targeted to perform as a System Area Network or SAN, providing the means of clustering many separate systems together to form a highly available networked-based system. Rather than competing with InfiniBand, LDT will complement it, providing the high speed data paths in the box that can easily support the high bandwidth requirements of SANs.

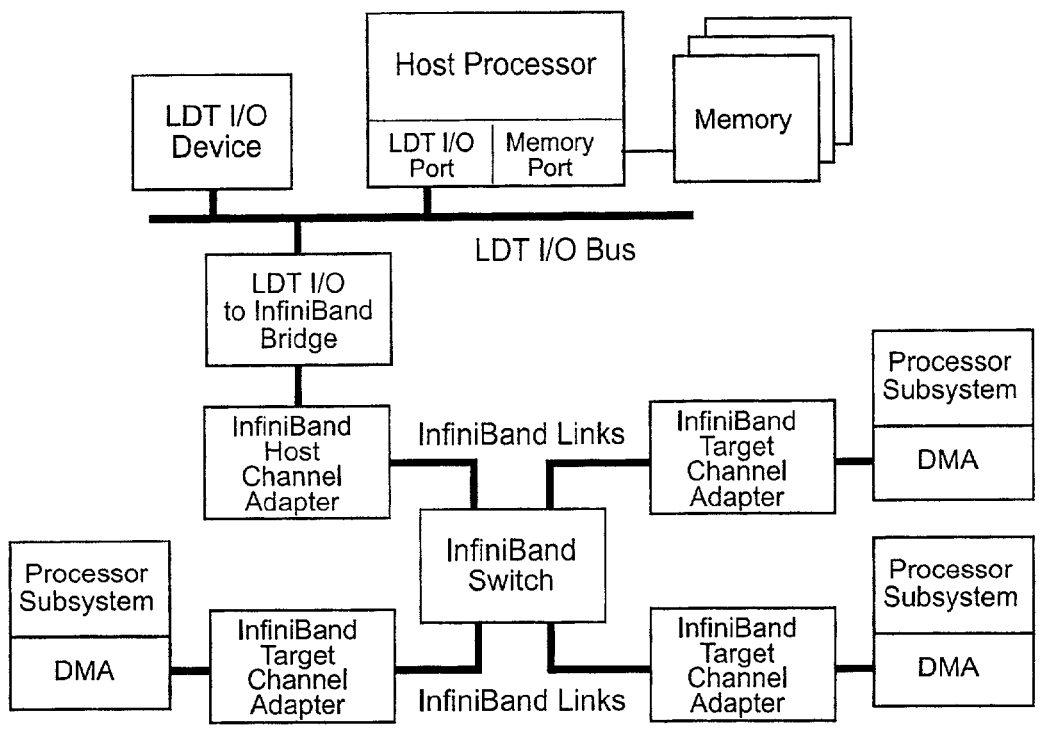

Figure 2 -- InfiniBand protocols are designed for high speed interconnection between subsystems comprising a System Area Network. LDT I/O complements InfiniBand by providing a high speed link between subsystem and InfiniBand networks.

RapidI/O, created by Motorola and proposed as an open standard to the industry, is similar to LDT in that it provides a high speed mechanism for inter-communications between on-board subsystems. By design, RapidI/O avoids high level protocols and supports only memory mapped I/O schemes. In addition it tries to anticipate system design requirements and limits the specification to provide only limited functionality in key areas. RapidI/O is defined as a three layer architectural hierarchy: a logical layer defines protocol and packet formats; a transport layer defines the routing information to move a packet from point to point; and a physical layer defines packet transport mechanisms, flow control, electrical characteristics and low level error management.

The RapidI/O architecture supports memory mapped distributed memory systems with a message passing protocol and an optional globally shared distributed memory programming model. Packets can contain a variety of data sizes. The complexity comes in when a local device attempts access of non-locally owned memory. The access must be controlled using a software maintained coherency method or a local device controlled message passing interface. This adds software complexity or additional hardware to the system. While the protocol and packet formats are independent of the actual system implementation, and may theoretically be used over serial or parallel interfaces, the standard is optimized for parallel byte-size data. It is anticipated that initial implementations will consist of 8- and 16-bit parallel point-to-point devices. The electrical interface will be the LVDS standard targeted towards short distance on-board links. With a frequency range from 250MHz to 1GHz, a maximum of 4 Gbytes/second can be achieved using a 16-bit interface.

Like LDT, RapidI/O is intended to complement the InfiniBand SAN-oriented protocols. LDT provides a greater range of flexibility (using 2 to 32-bit wide configurations) and a greater bus bandwidth (up to 12.8 Gigabytes/second).

LDT System Design
The foundation of the LDT I/O bus is dual point-to-point unidirectional links consisting of data path, control signals and clock signals. Each data path can be from two to 32 bits wide with standard bus widths of 2, 4, 8, 16 and 32 bits. Commands, addresses, and data share the data path. A link consists of the data path, a control signal and one or more clock signals. A complete LDT-based system consists of a processor with LDT port, the LDT bus, i.e., an input link and an output link, and any I/O channels connected to the LDT bus.

Traditional system bus architectures have a processor, a north bridge with memory and a mezzanine bus (usually a PCI bus) connected to additional PCI or custom I/O buses as shown below.

Traditional Processor, Memory and I/O Bus Structures
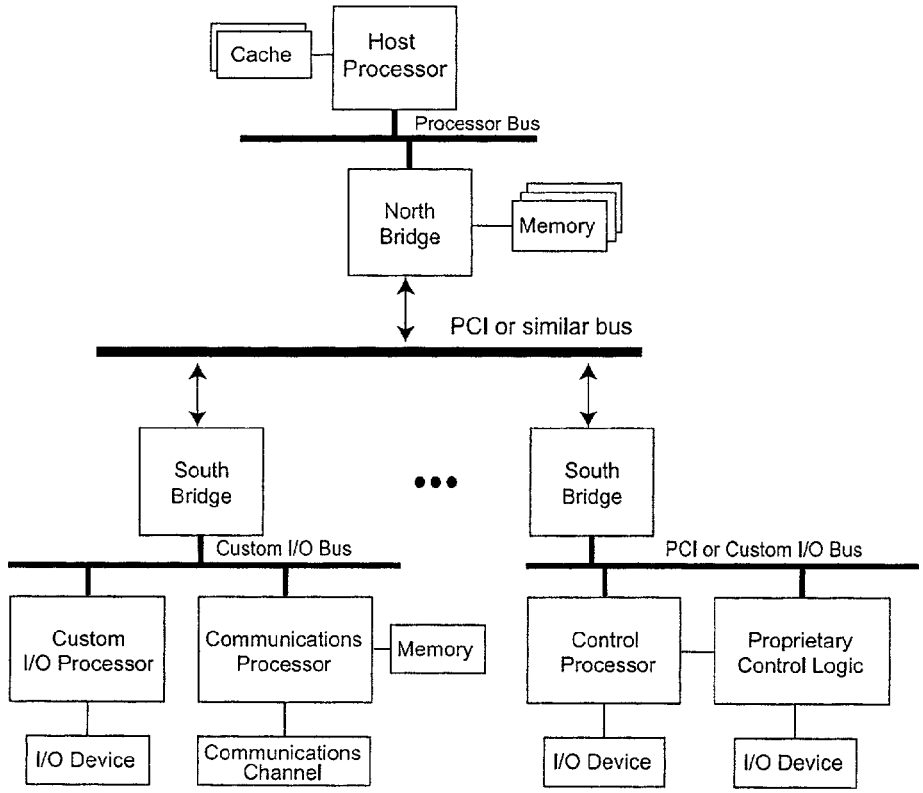
Figure 3 – A traditional north bridge/south bridge/PCI mezzanine bus structure.
A much higher bandwidth LDT I/O-based system could be configured as shown below.

LDT I/O-based Processor System

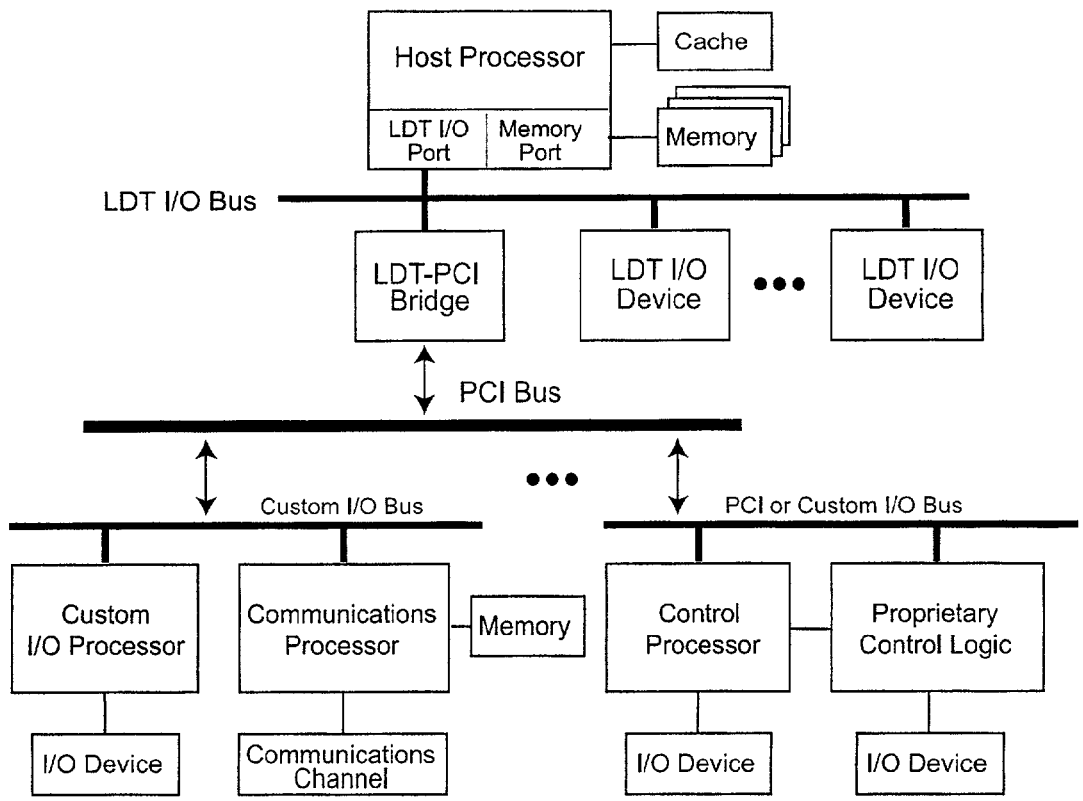

Figure 4 – The LDT I/O bus can be used to connect directly to high speed LDT I/O devices and to bridge to slower peripheral buses such as PCI. The LDT bus uses the same tree of buses structure as PCI.

The LDT I/O bus provides both point to point links and a scalable network topology using LDT I/O switching fabrics. As shown below, an LDT-based system can be expanded using LDT switches to support multilevel, highly complex systems.

An LDT I/O Switch handles multiple LDT I/O data streams and manages the interconnection between attached LDT I/O devices. A four port LDT switch could aggregate data from multiple downstream ports into a single high speed uplink, or it could route port-to-port connections.

Expanded LDT I/O-based Processor System

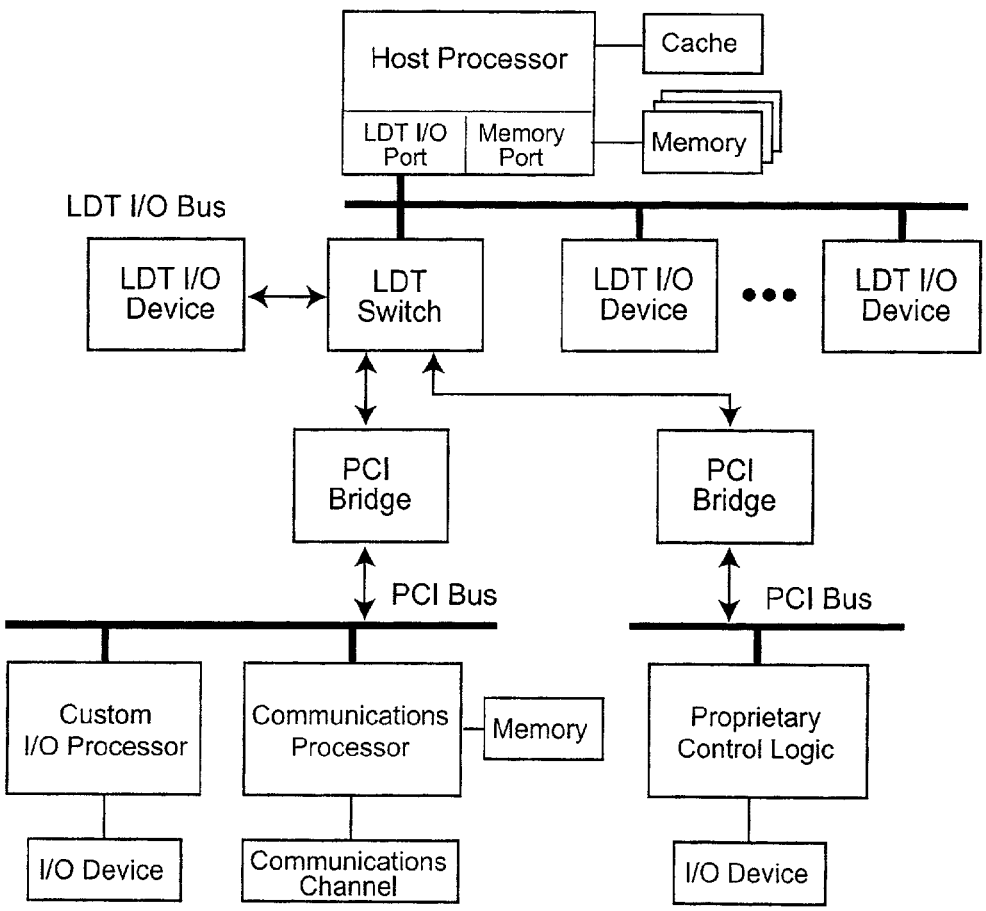

Figure 5 – Using a LDT I/O switch, a LDT-based system can support multiple LDT I/O devices and link multiple high speed data paths while simultaneously supporting multiple slower speed buses.

In this system, the LDT I/O bus enables the processor to talk directly to multiple LDT I/O devices on the bus and the LDT I/O switch enables connection to additional LDT I/O devices as well as to PCI-based subsystems through a PCI bridge.

Using LDT I/O as the building block, even very high speed systems such as an OC-192 WAN to Gigabit Ethernet LAN integration system can be developed. Such a system could be configured as shown below.

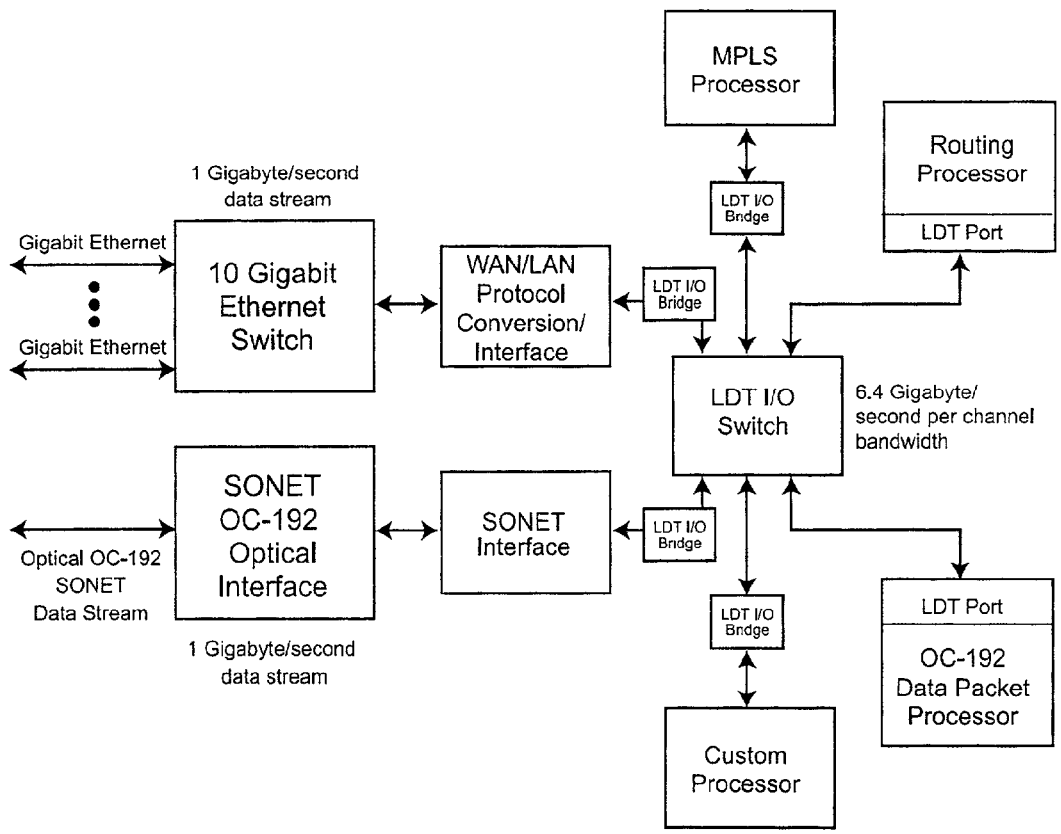

Figure 6 – The LDT I/O bus enables the design of high bandwidth optical switches and OC-192 WAN to LAN interfaces. The 10 Gigibit/second data stream of both OC-192 and 10Gb Ethernet can easily be routed through the system. A 16-bit LDT I/O bus can support 25.6 Gigabit/second bandwidth, enough for two OC-192 data streams.

In this configuration, a very high-speed (1 Gigabyte/second and up) data stream from 10 Gigabit/second Ethernet LANs can be connected to the high speed Internet backbone and to the WAN OC-192 Optical SONET standard at 10 Gigabit/second data rates. To smoothly connect LANs to the WAN Internet backbone, protocol conversion from Ethernet packet data to SONET protocols must be performed. The high speed network processors in the system can perform this protocol conversion as well as performing other networking tasks such as data routing, address lookup, SONET data processing, and MPLS tagging. The LDT I/O bus provides the high-speed data throughput required to connect all of the diverse processors to the high speed data stream, enabling wire-speed performance through the LAN/WAN interface.

LDT Basics

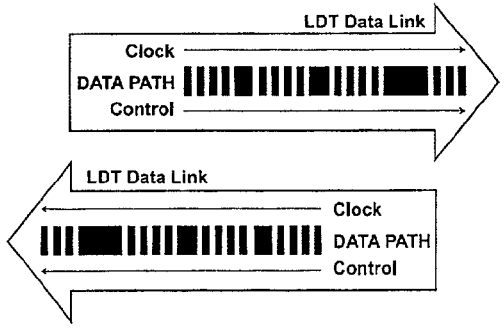

Figure 7 – The LDT I/O bus consists of two unidirectional, point-to-point links, each consisting of 2, 4, 8, 16, or 32-bit data paths, a single control signal and one or more clock signals.

An LDT I/O link is unidirectional, and in each direction can be 2 to 32 bits of data, with a single control signal and one or more clock signals. The data path supports standard bus widths of 2, 4, 8, 16, and 32 bits. Commands, addresses and data all share the data bus. The control signal indicates whether the information on the bus is a command or address or data. For each 8-bits or less of width, there is a forwarded clock signal. Information is transferred on both the rising edge and falling edge of the clock. Thus, a standard LDT I/O clock of 400 MHz yields an 800 MHz data rate per bit. By the end of 2001, clock frequencies for LDT devices are expected to at least double, providing a 1.6 Gbit/second data throughput per pair. This will enable a high-end LDT point to point bandwidth of 51.2 Gbits/second or 6.4 Gbytes/second.

| LDT I/O Bus Characteristics | | | | | |
|---|---|---|---|---|---|
| Bus Type | Bus Width | Bandwidth | Clock Speeds | Data Protocol | Signal Type |
| Dual uni-directional links | 2, 4, 8, 16, or 32 bits | 3.2 to 6.4 Gigabytes /second. | 400 MHz, moving to 800 MHz in 2001/2. | Packet based, with all packets multiples of four bytes (32-bits). LDT I/O commands, addresses and data are contained in packets. | Low-voltage differential signaling with a 60 Ohms differential impedance |

A full 32-bit implementation of the LDT I/O bus (32-bits in both directions) yields a 6.4 Gigabyte/second data rate in each direction. This provides the bandwidth that modern embedded processors require for tasks such as large database manipulation (network routers), multimedia processing (digital consumer products such as set-top boxes and game consoles), and compression algorithms and communication protocol conversions for communication systems.

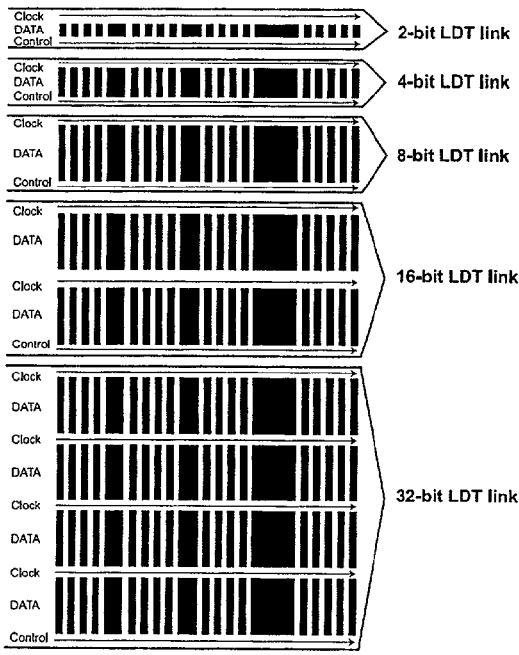

Figure 8 – The LDT bus supports standard data widths of 2, 4, 8, 16 and 32 bits. For each 8-bits or less of bus width, a clock signal is used. For each link, a single control signal indicates whether the data payload is a command, address or data packet. Every 8-bit or less of bus width is paired with a forwarded clock signal.

With a forwarded clock signal for each 8 bits or less of data width, the clock skew between the reference clock and bus signals is greatly reduced. Using multiple forwarded clocks for wider implementations greatly simplifies system design and debug of high speed functions. While a full 32-bit implementation yields an aggregate 6.4 Gigabyte/second bandwidth, a simpler, 2-bit implementation (2 bits in each direction) delivers a 400 Mbytes/second bandwidth in each direction, almost four times the peak bandwidth of PCI 32/33.

All LDT I/O commands, addresses and data are transported in packets. Packet lengths are multiples of four bytes and if the link is narrower than 32 bits, successive bit times are used to complete individual packet transfers.

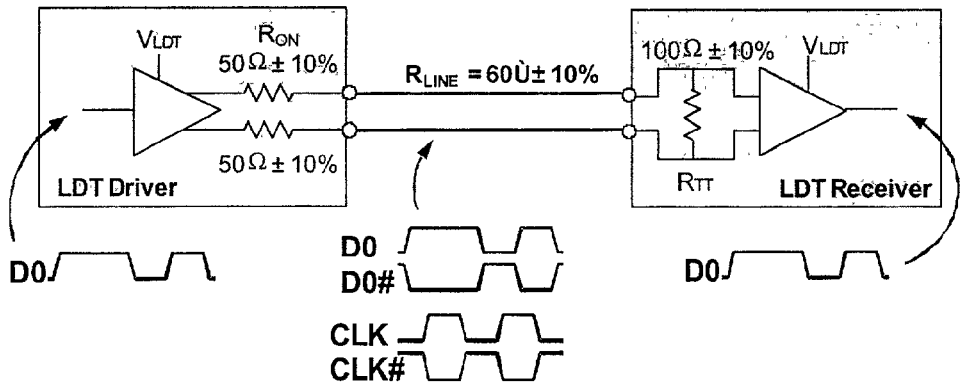

Figure 9 – The LDT bus uses low-voltage differential signaling at 1.2 volts, with a differential impedance of 60 Ohms.

LDT I/O uses low-voltage differential signaling with a differential impedance of 60 ohms for command, address, data, clock, and control signals. The driver supply voltage is 1.2 volts. Differential signaling and the specified impedance provide a robust signaling system for use with low-cost printed circuit boards required for many embedded systems. Standard four-layer PCB material with no special layer techniques is sufficient for routing LDT interconnections. This is significant in the cost-sensitive manufacturing environment because special PCB material stackups and additional layers can easily triple the PCB material cost for a motherboard. The 50-ohm impedance and differential signaling also permit trace lengths up to 24 inches, and they span board interconnects well.

There is an ongoing effort with major connector companies to define a variety of connectors that can fit different price/performance parameters. More information on this topic will be available in 2001.

Differential signaling affects the number of pins in a LDT bus since it requires two pins per bit. However, pin count is reduced using LDT because of two other factors. First, because the LDT operates at higher clock frequencies, fewer pins can deliver better bandwidth than competing approaches. Second, differential signaling provides a return current path for each signal, which greatly reduces the number of $V_{LDT}$ power and ground pins needed for a given package.

As shown in the table, in addition to command, address, data, clock and control pins, each LDT device will require $V_{LDT}$ power, ground, PWROK (Power Okay) and RESET_L (LDT Reset) pins.

| LDT Pin Requirements | | | | | |
|---|---|---|---|---|---|
| Bus Width (Each Way) | 2 | 4 | 8 | 16 | 32 |
| Data Pins (total) | 8 | 16 | 32 | 64 | 128 |
| Clock Pins (total) | 4 | 4 | 4 | 8 | 16 |
| Control Pins (total) | 4 | 4 | 4 | 4 | 4 |
| High Speed Subtotal | 16 | 24 | 40 | 76 | 148 |
| VLDT | 2 | 2 | 3 | 6 | 10 |
| GND | 4 | 6 | 10 | 19 | 37 |
| PWROK | 1 | 1 | 1 | 1 | 1 |
| RESET_L | 1 | 1 | 1 | 1 | 1 |
| Total Pins | 24 | 34 | 55 | 103 | 197 |

The Power Okay and Reset pins are single ended because of their low frequency use. For a low cost implementation, system developers can use the 2-bits in each direction LDT bus and achieve a 400 Mbytes/second LDT I/O bus with just 24 pins including $V_{LDT}$ and ground pins. This is by far the lowest cost implementation for I/O bus speeds in this range.

In some embedded applications, such as battery powered communications systems, digital entertainment devices, and handheld PCs, power consumption is a very critical design constraint. To support those applications, the LDT I/O bus has defined and LDTStop_L (LDT Stop). This pin will put the LDT bus in a low-power state where virtually no power is used by the bus.

Configuring LDT I/O Devices
LDT I/O devices with equal width transmitter and receiver links can be easily and directly connected. LDT I/O devices with transmit and receive links of different widths can also be easily and directly connected. Extra receiver pins are tied to logic zero while extra transmitter pins are left open. During power up, the RESET_L is asserted and control is at logic zero, each LDT device transmits a bit pattern indicating the width of its receiver. Detection logic in each LDT device determines the maximum safe width for its transmitter and adjusts its output and receive channels to use only the safe maximum. This assures that LDT devices will communicate correctly before any software setup or configuration software is needed to optimally configure each device.

For systems using BIOS routines to configure I/O activity, LDT I/O devices use standard Plug 'n Play methodologies for exposing the control registers for BIOS routines to optimize the bus configuration. Other system firmware can be easily adapted. Enumeration of LDT devices and Bridges proceeds exactly like PCI enumeration using the same configuration header structures. AMD has registered the LDT Specific Capabilities Block with the PCI SIG. This encapsulates all the additional configuration information and settings needed for LDT. When a BIOS, or other firmware, enumerates the system's buses, this capabilities block will automatically be discovered as a part of the linked list of other capability blocks for other devices. If a LDT I/O Host Bridge exists, the LDT I/O devices connected to the bridge can be enumerated as well. This protocol performs exactly like that used for PCI devices.

Drivers for LDT I/O devices will be unique to the devices, but they are no more complex than similar PCI type I/O device drivers. To make porting from PCI devices to LDT devices easier, the LDT I/O chain from a host bridge is enumerated like a PCI bus and devices and functions within an LDT I/O device are enumerated like PCI devices and functions.

LDT I/O Bus Packet Protocols
Communications between LDT I/O devices uses the metaphor of data streams. A LDT I/O bus can handle multiple data streams between devices simultaneously. LDT I/O devices can be daisy chained so that some streams may be passed through a node to the next node.

All data and commands are transmitted through a packet of information four bytes wide. Packets contain Source ID fields in the packet header and a data payload. There can be up to 32 IDs within a LDT I/O bus chain with some LDT I/O nodes containing multiple LDT I/O devices. Each LDT I/O node will determine if the information it is receiving is targeted to a device with the node. If not, the information packet is passed through to the next node. If an LDT I/O device at the end of the chain is not the target device, an error response is passed back to the Host Controller.

Commands and response from the Host controller have a Source ID of zero. Commands and responses sent from other LDT I/O devices have their own unique ID.

As shown in the figure below, a typical PC configuration could have a LDT Host Bridge daisy chained to a LDT to PCI-X Bridge and a South Bridge with multiple devices including a PCI-32 Bus Bridge.

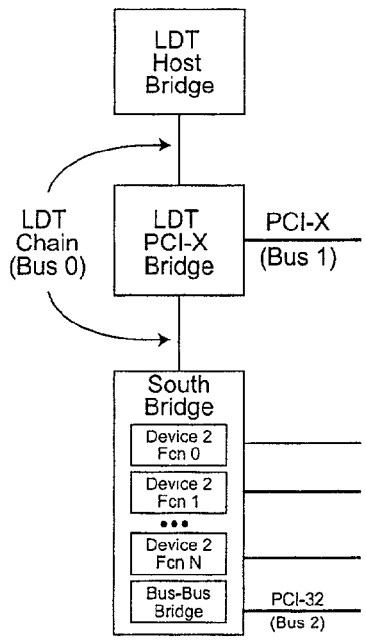

Figure 10 – A typical LDT I/O bus chain can support multiple bus bridges as well as multifunctional LDT I/O devices.

If a bus mastering LDT I/O device like a hard drive controller in the South Bridge sends a write command to memory above the Host Bridge, the command will be sent with the Source ID of the LDT device in the South Bridge. LDT permits posted writes such that the device does not wait for an acknowledgement of the write before proceeding. This is useful for large data transfers that will be buffered at the receiving end.

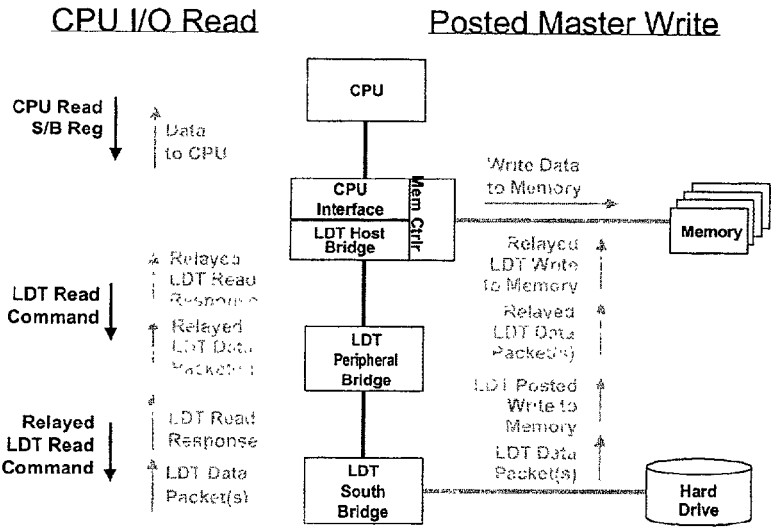

LDT transactions are divided into multiple virtual channels that have ordering semantics applied within those channels (but not between channels). LDT supports the PCI ordering and coherency model while allowing split transactions and more overlap between operations that are guaranteed to be unrelated.

LDT provides the same special handling as PCI for Read Responses with respect to Posted Writes. To illustrate, consider what would happen in the two examples above if the read request in the first example was to check a status register in the bus mastering LDT hard drive controller in the South Bridge that indicates whether the Posted Write to memory had completed. If the response to reading the status register can pass the Posted Write, the processor may be told the write had been completed before it actually happens and an immediate read at the memory location could yield the wrong data.

To prevent this, normally LDT does not allow Read Responses to pass Posted Writes within the same stream. A special bit in the Read Request, the pass posted write bit (PassPW), can be used to allow Read Responses to pass Posted Writes when it is safe to do so. In this way the handling of Read Responses can be accelerated.

Usually, LDT does not enforce ordering between streams. LDT I/O has special commands for forcing all streams to stay behind a fence command and to flush all commands from the chain. These are helpful in handling protocols for bridges to other common buses such as the AGP graphics bus.

LDT I/O Command Syntax

All LDT I/O commands are four bytes long and begin with a six-bit command type field. The most common type of commands are Read Requests, Read Responses, and Writes. The remainder of the four bytes is command specific. The PassPW bit is located here.

| Bit Time | 7 | 6 | 5 | 4 | 3 | 2 | 1 | 0 |
|---|---|---|---|---|---|---|---|---|
| 0 | | | | Command Type | | | | |
| 1 | PassPW | | | | | | | |
| 2 | | | | Command Specific Information | | | | |
| 3 | | | | | | | | |
| 4 | | | | | | | | |
| 5 | | | | Read and Write Command Address | | | | |
| 6 | | | | | | | | |
| 7 | | | | | | | | |

When the command requires an address, the last byte of the command is concatenated with an additional four bytes to create a 40-bit address.

A Write command or a Read Response command is followed by data packets. Data packets are four bytes to 64 bytes long in four-byte increments. The illustration below shows a packet of eight bytes.

| Bit Time | 7 | 6 | 5 | 4 | 3 | 2 | 1 | 0 |
|---|---|---|---|---|---|---|---|---|
| 0 | | | | Data [7:0] | | | | |
| 1 | | | | Data [15:8] | | | | |
| 2 | | | | Data [23:16] | | | | |
| 3 | | | | Data [31:24] | | | | |
| 4 | | | | Data [39:32] | | | | |
| 5 | | | | Data [47:40] | | | | |
| 6 | | | | Data [55:48] | | | | |
| 7 | | | | Data [63:56] | | | | |

Transfers of less than four bytes are padded to the four-byte minimum. Special sized reads and writes are supported with a four-byte mask field preceding the data. This is useful when transferring data to or from graphics frame buffers where the application should only affect certain bytes that may correspond to one primary color or some other characteristic of the displayed pixels. A control bit in the command indicates whether the writes are byte or doubleword size.

Reads and writes to PCI I/O space are mapped into a separate memory range eliminating the need for separate memory and I/O control lines or control bits in read and write commands. An additional memory range is used for in-band signaling of interrupts. A device signaling an interrupt performs a byte-sized write command targeted at the reserved memory space. The host bridge is responsible for delivery of the interrupt to the internal target.

LDT I/O Implementations
LDT I/O supports a daisy chain connection scheme that enables LDT devices that are building blocks applicable to a wide range of embedded applications. For example a standard LDT I/O chipset could be used with a 32-bit embedded processor in a low-cost consumer application. The same chipset could be used in high-end applications in both the main system bus and auxiliary mezzanine I/O buses. Several embedded processor technology companies are currently working on processors with LDT I/O ports for use in high-end communications and networking equipment.

Summary

The LDT I/O bus architecture is an ideal solution to the next generation of embedded systems. It delivers up to 64 times the bandwidth of the 32-bit 33 MHz PCI bus commonly used to link I/O devices, yet is easy to implement. It also provides a scalable solution so that precise cost and space specifications can be matched to application requirements. It can be used in a wide variety of applications, ranging from desktop PCs and high-end servers to low-cost, low power embedded digital consumer applications and high performance network equipment – while maintaining compatibility with existing PCI-based software.

There are numerous companies working on the first generation LDT devices including API NetWorks, Inc. and AMD as well as several vendors using MIPS-based processor technology. The first silicon devices supporting the LDT I/O bus protocols should be appearing in the first quarter of 2001.

©2000 API NetWorks, Inc. All rights reserved.

For more information about API NetWorks, Inc., please visit the website at: www.api-networks.com.

I claim:

1. A method of merging a first data stream with a second data stream to generate a third data stream, comprising:
   a) receiving a first packet from the first data stream, the first packet containing a first packet ID and a first data payload;
   b) receiving a second packet from the second data stream, the second packet containing a second packet ID and a second data payload;
   c) storing a first data in a plurality of packet ID arrival registers, a first portion of the first data indicating that the first packet ID is equal to an ID associated with a first of the plurality of the packet ID arrival registers, a second portion of the first data indicating that the first packet ID is not equal to the ID associated with a second of the plurality of the packet ID arrival registers;
   d) storing a second data in the plurality of packet ID arrival registers, a first portion of the second data indicating that the second packet ID is equal to the ID associated with the second of the plurality of the packet ID arrival registers, a second portion of the second data indicating that the second packet ID is not equal to the ID associated with the first of the plurality of the packet ID arrival registers;
   e) calculating a first autocorrelation vector that is indicative of the arrival rate of incoming packets in the first data stream;
   f) calculating a second autocorrelation vector that is indicative of the arrival rate of incoming packets in the second data stream; and
   g) based at least in part upon a comparison of a magnitude of the first autocorrelation vector and a magnitude of the second auto correlation vector, including the first packet in the third data stream.

2. The method of claim 1, wherein the act of receiving a first packet includes receiving the first packet from an HT I/O device.

3. The method of claim 1, wherein the act of receiving a first packet includes receiving the first packet from an HT I/O device and the act of receiving a second packet includes receiving the second packet from an HT I/O device.

4. The method of claim 1, wherein the act of storing first data in a plurality of packet ID arrival registers includes storing a "1" in the first packet U) arrival register.

5. The method of claim 1, wherein the act of storing first data in a plurality of packet ID arrival registers includes storing a "0" in the second packet ID arrival register.

6. The method of claim 1 wherein the act of calculating an autocorrelation vector includes calculating a biased autocorrelation vector.

7. The method of claim 1 wherein the act of calculating an autocorrelation vector includes calculating an unbiased autocorrelation vector.

8. The method of claim 1, wherein the act of calculating the first autocorrelation vector is performed by a HyperTransport I/O device.

9. The method of claim 1, wherein the act of calculating the first autocorrelation vector is performed by a HyperTransport I/O switch.

10. The method of claim 1, wherein the act of calculating the first autocorrelation vector includes calculating the following equation:

$$Rxx(T) = \frac{1}{N-T}\sum_{n=0}^{N-1} x(n)x(n+T)$$

where T and N are integers, and x is an array that includes data stored in one of the plurality of packet ID arrival registers.

11. The method of claim 1, wherein the act of receiving the first packet includes receiving the first packet from a second HT I/O device and the act of receiving the second packet includes receiving the second packet from a third HT I/O device.

12. The method of claim 1, wherein the act of receiving the first packet includes receiving the first packet from an internal port within the HT I/O device and the act of receiving the second packet includes receiving the second packet from a second HT I/O device.

13. The method of claim 1, wherein the act of calculating the first autocorrelation vector includes copying the data in the first packet ID arrival register, shifting the copied data by T elements, where T is an integer, the result being referred to as shifted data.

14. The method of claim 13 further including multiplying the shifted data with the data in the first packet ID arrival register.

* * * * *

UNITED STATES PATENT AND TRADEMARK OFFICE
CERTIFICATE OF CORRECTION

PATENT NO. : 7,117,278 B2 Page 1 of 1
APPLICATION NO. : 09/905483
DATED : October 3, 2006
INVENTOR(S) : James M. Avery It is certified that error appears in the above-identified patent and that said Letters Patent is hereby corrected as shown below:

In claim 4 (at column 47, line 45), please delete, "U)" and replace with --ID--.

Signed and Sealed this

Twenty-sixth Day of December, 2006

JON W. DUDAS
*Director of the United States Patent and Trademark Office*